United States Patent
Cook et al.

(10) Patent No.: US 6,438,833 B1
(45) Date of Patent: Aug. 27, 2002

(54) CONTROL SYSTEM AND METHOD OF USE FOR ALIGNING A PISTON ASSEMBLY WITH AN ENGINE BLOCK

(75) Inventors: James A. Cook, Delphi; Brad A. Moore, Frankfort; Kevin R. Shaffer, West Lafayette; James L. Thien, Logansport; Robert L. Walters, Lafayette, all of IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/606,946

(22) Filed: Jun. 29, 2000

(51) Int. Cl.⁷ .................................................. F02B 53/00
(52) U.S. Cl. ........................ 29/888.01; 29/407.01; 29/407.05; 29/407.09; 29/407.1
(58) Field of Search ................ 29/888.01, 888.044, 29/407.01, 407.05, 407.09, 407.1, 464, 702, 703, 705, 709, 712, 714, 271, 281.5; 269/71

(56) References Cited

U.S. PATENT DOCUMENTS

| | | | |
|---|---|---|---|
| 3,952,393 A | * 4/1976 | van Ravenswaay et al. ........... 29/888.044 |
| 4,794,690 A | * 1/1989 | Yamanaga et al. ............ 29/709 |
| 4,887,341 A | * 12/1989 | Sakimoro et al. .............. 29/464 |
| 5,974,650 A | * 11/1999 | Kawabata et al. ......... 29/281.5 |
| 6,047,472 A | * 4/2000 | Koch et al. .............. 29/888.01 |
| 6,138,340 A | * 10/2000 | Yoshida ..................... 29/281.5 |

FOREIGN PATENT DOCUMENTS

| JP | 401281832 A | * 11/1989 | ............ 29/888.044 |
|---|---|---|---|
| JP | 1103847 A | * 2/1999 | |

* cited by examiner

Primary Examiner—S. Thomas Hughes
Assistant Examiner—Jermie E. Cozart
(74) Attorney, Agent, or Firm—McGuireWoods LLP

(57) ABSTRACT

A control system and method of use for aligning a piston assembly with a cylinder of an engine block. The control system enables the piston assembly to be properly aligned with the cylinder prior to inserting the piston assembly into the cylinder. The control system includes an apparatus which compares positional information associated with the piston assembly and an apparatus which instructs movement of the piston assembly with respect to the cylinder in response to the positional information.

11 Claims, 3 Drawing Sheets

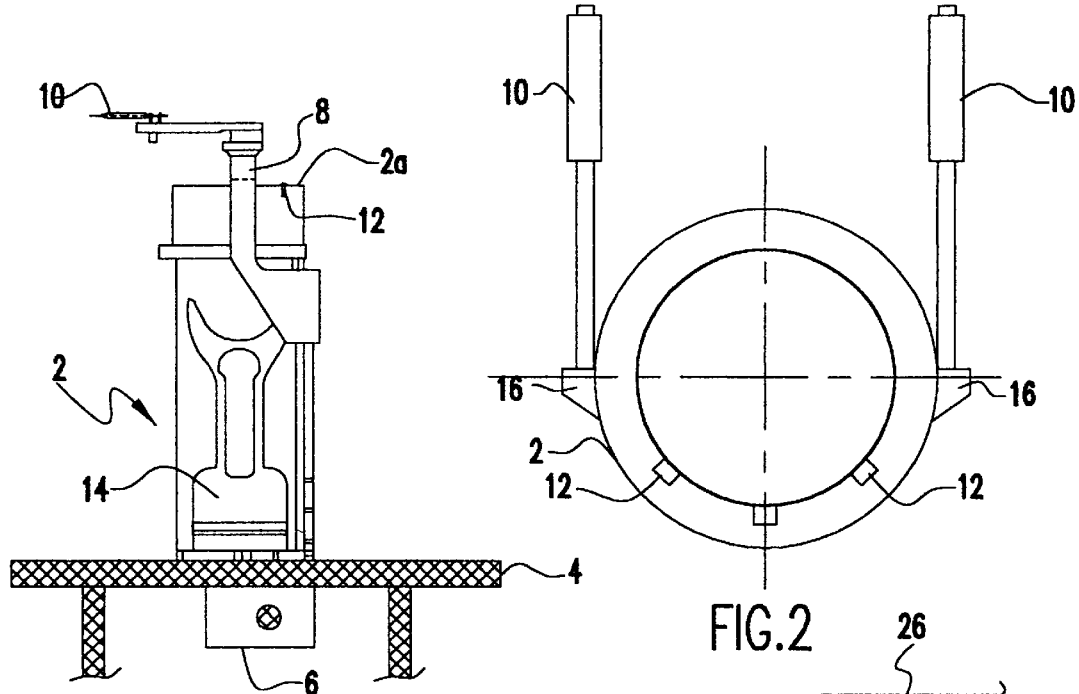
FIG.1
FIG.2
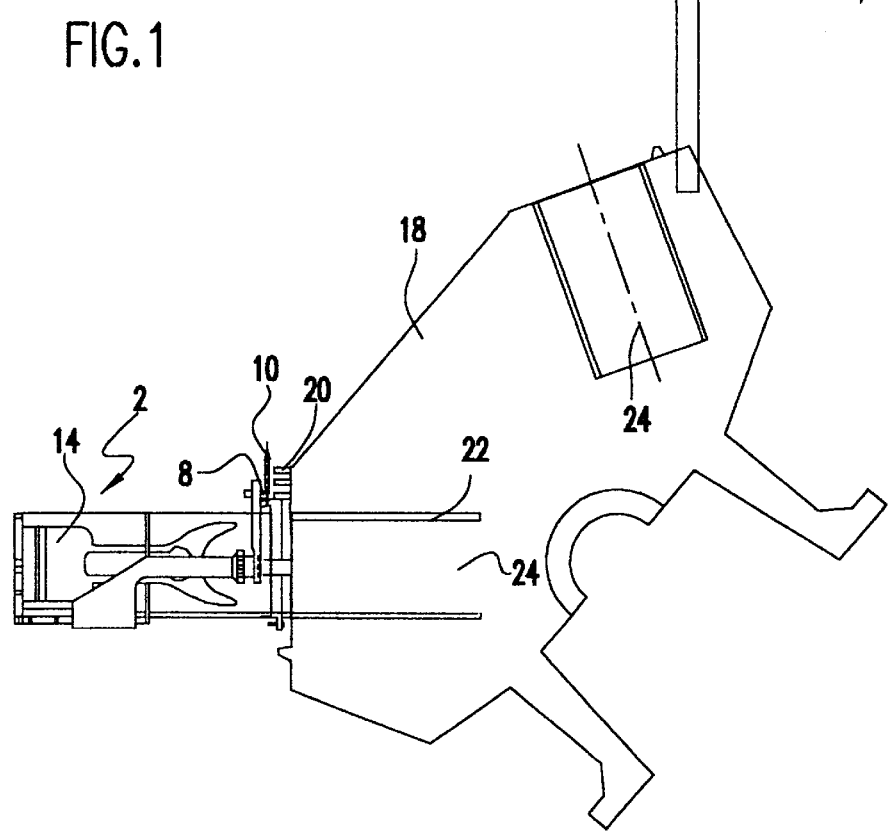
FIG.3

CONTROL SYSTEM AND METHOD OF USE FOR ALIGNING A PISTON ASSEMBLY WITH AN ENGINE BLOCK

TECHNICAL FIELD

This invention relates generally to a control system and more particularly to a control system and method of use for aligning a piston assembly with a cylinder of an internal combustion engine.

BACKGROUND ART

Internal combustion engines include a vast array of components which need to be assembled in a very precise manner. This ensures that the internal combustion engine is working in an efficient manner within its design parameters. However, the assembly of an internal combustion engine is both time consuming and arduous even for the most experienced technician, taking many hours or even days to properly assemble the many components.

In assembling an internal combustion engine, the technician manually performs many of the assembly steps, even those steps which require aligning heavy and awkward components with the engine block, such as aligning piston assemblies with respective cylinders of an engine block. In the example of aligning the piston assemblies with respective cylinders, the technician first assembles the piston assembly by connecting a connecting rod to the piston with a pin and placing rings within grooves of the piston crown. Once the rings are placed within the grooves, the technician then places the piston and rings within a piston ring compressor. The piston ring compressor compresses the piston rings within the grooves of the piston crown so that the piston assembly can be properly inserted within the cylinder.

Once the piston assembly is inserted within the piston ring compressor, the technician manually lifts the piston assembly including the piston ring compressor and manually aligns the piston with the cylinder. This is a very difficult assembly step, especially since the combination of the piston ring compressor and piston assembly may weigh upwards of twenty five (25) kilograms (approximately fifty five (55) pounds) or more in those cases when the piston assembly is used in large internal combustion engines. This makes the lifting and aligning steps very awkward and cumbersome.

In order-to solve this problem, it is not uncommon for a second technician to assist in either the lifting or aligning steps. The second technician can thus ensure that the piston assembly is properly aligned with the cylinder of the engine block and especially that the connecting rod is properly aligned with and connected to the crankshaft. This solution is not very efficient, however, and typically leads to higher manufacturing and production costs. This is simply because two technicians are needed to lift and/or align the piston assembly.

The present invention is directed to overcoming one or more of the problems as set forth above.

DISCLOSURE OF THE INVENTION

In one aspect of the present invention a control system for aligning a piston assembly with a cylinder of an engine block is provided. The control system has an apparatus which compares positional information associated with the piston assembly and an apparatus which instructs movement of the piston assembly with respect to the cylinder.

In another aspect of the present invention a method for controlling alignment of the piston assembly with respect to the cylinder is provided. The positional information of the piston assembly is compared with respect to the engine block, and the piston assembly is aligned with the cylinder in response to the positional information.

BRIEF DESCRIPTION OF THE DRAWINGS

FIG. 1 shows a diagrammatic side plan view of a piston ring compressor having sensors used with the control system of the present invention;

FIG. 2 shows a diagrammatic front plan view of the piston ring compressor;

FIG. 3 shows a diagrammatic side view of the piston ring compressor placed proximate to an engine block;

BEST MODE FOR CARRYING OUT THE INVENTION

Figure 4:
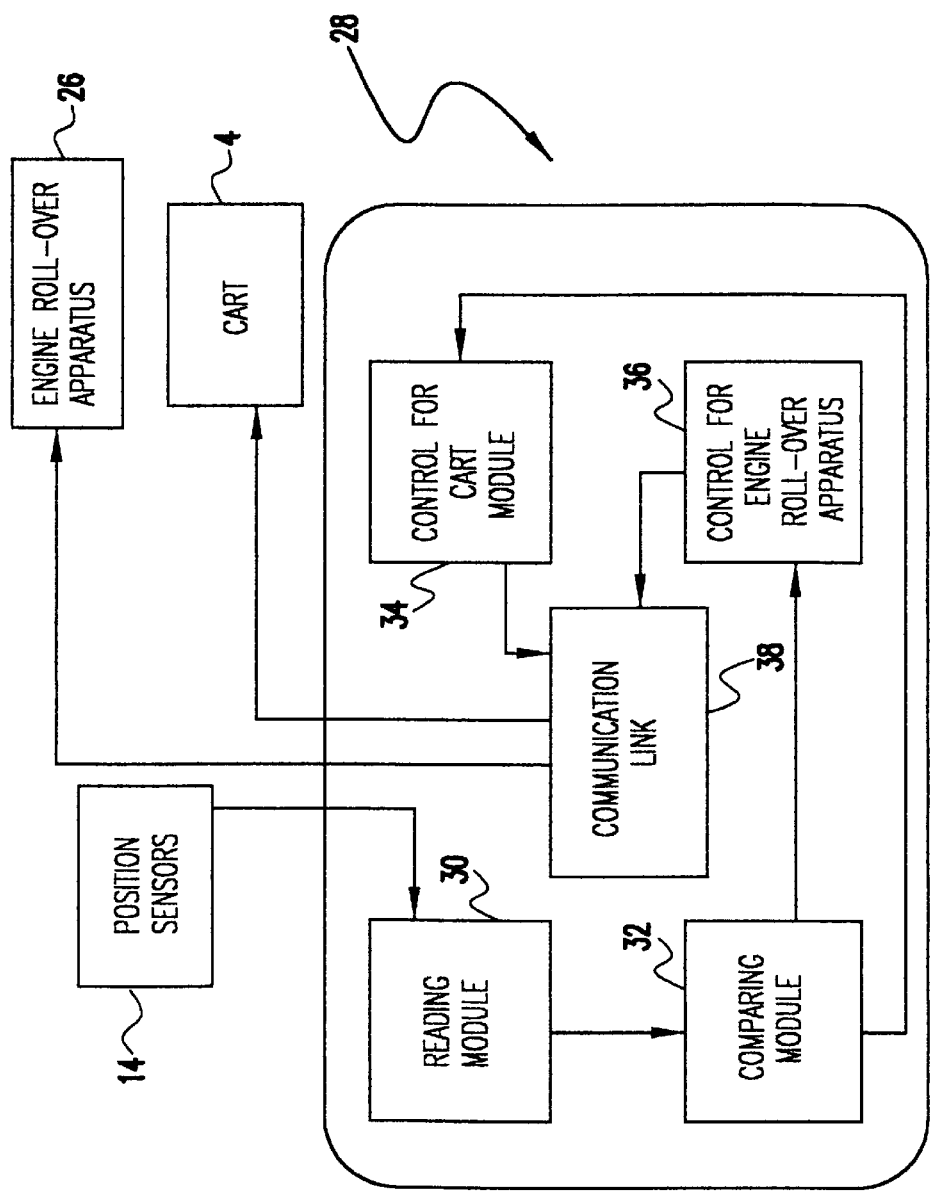
FIG. 4 shows a block diagram of the control system of the present invention.

Referring to FIG. 1, a piston ring compressor 2 adapted for use with the control system of the present invention is shown. The piston ring compressor 2 is preferably shaped as a barrel and may be mounted on a cart 4 or a piston insertion machine(hereinafter referred to as the "cart"). In general, the cart 4 may include a mechanism 6 which is capable of moving the piston ring compressor 2 relative to an engine block, and inserting a piston assembly into a cylinder of the engine block. The cart 4 is in electronic communication with the control system of the present invention.

Referring still to FIG. 1, the piston ring compressor 2 includes an outward extending arm 8 having at least one position sensor 10 adapted for use with the control system of the present invention. The position sensor 10 is preferably a linear variable distance transducer 10. Positional information determined by the position sensor 10 is provided to the control system of the present invention. Those skilled in the art should recognize that the position sensor 10 is not limited to a linear variable distance transducer, but may be any known position sensor such as an ultrasonic sensor and the like.

A proximity sensor 12 extends from the piston ring compressor 2. A piston assembly 14 is placed within the piston ring compressor 2, but is not critical to the understanding of the present invention.

FIG. 2 shows a diagrammatic front plan view of the piston ring compressor 2. In this view, two position sensors 10 are located about the circumference of the piston ring compressor 2; however, more than two position sensors 10 may equally be used with the piston ring compressor 2. A hinge mechanism 16 pivotally mounts the position sensors 10 to the piston ring compressor 2.

FIG. 3 shows the position sensors 10 in close proximity to an engine block 18 and more preferably near head bolts 20 adjacent to a cylinder liner 22 of the engine block 18 (proximate to a cylinder 24). In this figure, the piston ring compressor 2 is in a horizontal position. An engine block rollover apparatus 26 is connected to the engine block 18. The engine block rollover apparatus 26 electronically communicates with the control system of the present invention.

FIG. 4 shows a representational view of a block diagram of the control system of the present invention. The control system 28 includes a reading apparatus 30 which receives and reads positional information from the position sensors 10. This positional information is then provided to a comparing apparatus 32. The comparing apparatus compares the values of the position sensor readings, and may also determine whether a reading of a first position sensor and a second position sensor are less than, greater than or equal to a predetermined value (e.g., zero).

Once the comparing apparatus 32 compares the readings of the position sensors 10, such comparison information is provided to the control apparatus 34 for the cart 4 and the control apparatus 36 for the machine rollover apparatus 26. These control apparatus 34 and 36 provide movement controls to either the cart 4 or the engine block rollover apparatus 26, respectively, via control signals. The control signals may be sent to the cart 4 and/or engine block rollover apparatus 26 via a communication link 38. It should be understood that the control system 28 may be one discrete unit, but are discussed separately herein for clarity purposes.

Figure 5:
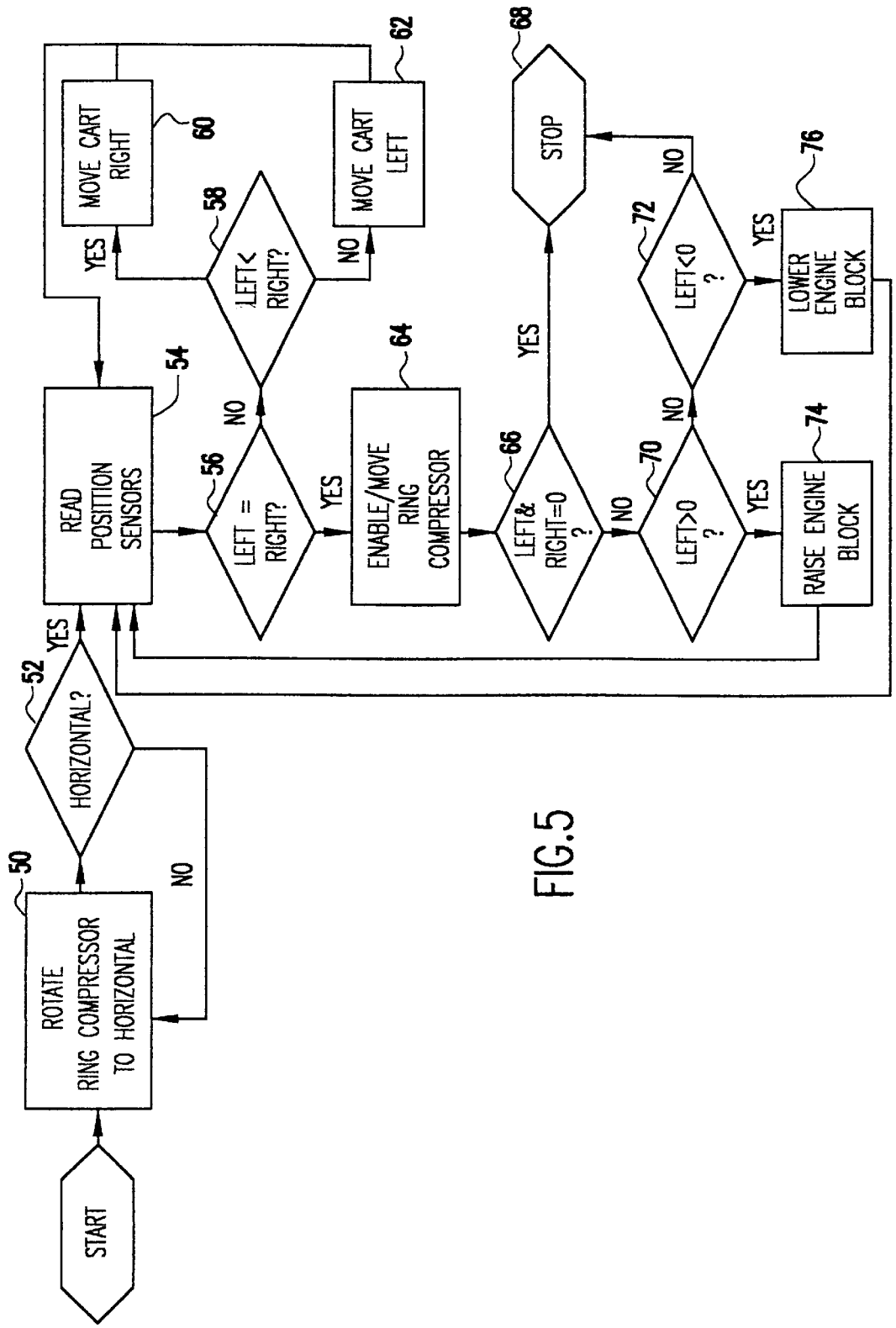
FIG. 5 shows a flow diagram of the control system of the present invention.

FIG. 5 shows the flow of the control system of the present invention, and may also represent a high level block diagram of the control system which implements the steps of the flow diagram now depicted in FIG. 5. The control system may be implemented using any device or assembly of devices capable of implementing the flow charts shown in FIG. 5 such as, for example, a programmed general purpose computer or other processing device.

The control system of the present invention is described using two position sensors 10, a right position sensor and a left position sensor. The control system can also be used with more than two position sensors 10. As will now be described, these position sensors 10 sense the position of the piston ring compressor 2 with respect to a known position on the engine block 18 (preferably a known head bolt 20), and provide that positional information to the control system.

Referring now to FIG. 5, in step 50, the piston ring compressor 2 is rotated from the vertical position of FIG. 1 to the horizontal position of FIG. 3. In step 52, a determination is made as to whether the piston ring compressor 2 is in the horizontal position. If not, the control system of the present invention reverts back to step 50.

Once the piston ring compressor 2 is rotated to the horizontal position, the control reads the values of the position sensors 10 at step 54. In step 56, a determination is made as to whether the reading of the left position sensor is equal to the reading of the right position sensor. If the readings are not equal in step 56, a determination is made as to whether the reading of the left position sensor is less than the reading of the right position sensor in step 58.

If the reading of the left position sensor is less than the reading of the right position sensor, the cart 4 or piston ring compressor 2 is then moved right (step 60) and steps 54 and 56 are repeated. If the reading of the left position sensor is greater than the reading of the right position sensor, then the cart 4 is moved left (step 62) and steps 54 and 56 are repeated. It is noted that after step 58, a light (not shown) may be illuminated to inform the technician that the conditions of step 58 have not been satisfied. In this case, the technician may manually position the cart 4 prior to the steps 60 and 62. If the readings of the left position sensor and the right position sensor are equal in step 56, the control system instructs the cart 4 to move the piston ring compressor 2 towards the engine block 18 (step 64).

In step 66, a determination is made as to whether the reading of the left position sensor and the reading of the right position sensor are equal to zero. If the readings are equal to zero, then the control system stops in step 68 (i.e., the piston ring compressor 2 is properly aligned with the engine block 08 and more preferably the cylinder 24 of the engine block 18). At this stage, the piston assembly 14 may then be inserted within the respective cylinder 24 of the engine block 18.

If the readings in step 66 are not equal to zero, a determination is then made in step 70 as to whether the reading of the left position sensor is greater than zero (regardless of the value of the right position sensor). If the reading of the left position sensor is greater than zero, the engine block 18 is then raised in step 74 via the engine block rollover apparatus 26. The steps starting at step 54 are then repeated until a proper alignment of the piston ring compressor 2 with the engine block 18 is achieved.

If the reading of the left position sensor is not greater than zero in step 70, a determination is then made in step 72 as to whether the reading of the left position sensor is less than zero (regardless of the value of the right position sensor). If the reading of the left position sensor is less than zero, the engine block 18 then is lowered in step 76 via the engine block rollover apparatus 26. The steps starting at step 54 are then repeated until a proper alignment of the piston ring compressor 2 with the engine block 18 is achieved. If the left position sensor reading in step 72 is not less than zero, the control system then stops in step 68 (i.e., the piston ring compressor 10 is properly aligned with the engine block 18 and more preferably the cylinder 24 of the engine block 18). The steps of 70 and 72 may be performed simultaneously.

It is noted that in embodiments, after steps 70 and 72 are performed, a light may be illuminated to inform the technician that the conditions of steps 70 and 72 have been satisfied. In these cases, the technician may manually move the engine block 18.

Industrial Applicability

In operation, the control system 28 aligns the piston assembly 14 with the cylinder 24 of the engine block 18 by receiving positional information from the position sensors 10. The positional information determined by the position sensors 10 is provided to the control system 28 which is then translated into controls for moving either the cart 4 or the engine block 18. The control system 28 is capable of providing controls requesting the cart 4 to move the piston ring compressor 2 either left or right with relation to the engine block 18, as well as towards and away from the engine block 18. The control system 28 is also capable of providing controls requesting the engine block rollover apparatus 26 to move the engine block 18 up or down.

Being more specific, the position sensors 10 are moved toward the engine block 18 so that the position sensors 10 can be in close proximity to the cylinder liner 22 of the cylinder 24. The position sensors 10 generate positional information of the piston assembly 14 with relation to the cylinder 24, which is then received by the reading apparatus 30. The reading apparatus 30 reads the positional information, and forwards the positional information to the comparing apparatus 32. The comparing apparatus 32 compares the values of the position sensor readings, and determines whether a reading of the left positional sensor is greater than, equal to or less than a reading of the right positional sensor. The comparing module 32 may also determine whether a reading of the left position sensor and the right position sensor are less than, greater than or equal to a predetermined value (e.g., zero).

Once the comparing module 32 compares the readings of the position sensors, such comparison information is provided to the control apparatus 34 and 36 for the cart 4 and the engine block rollover apparatus 26, respectively. These control apparatus 34 and 36 instruct the cart 4 and the engine block rollover apparatus 26 to move in accordance with the control signal to thus align the piston assembly 14 with the cylinder 24 of the engine block 18.

Other aspects, objects and advantages of this invention can be obtained from a study of the drawings, the disclosure and the appended claims.

What is claimed is:

1. A method for controlling alignment of a piston assembly with respect to a cylinder of an engine block, comprising:

comparing positional information of the piston assembly with respect to the engine block, the positional information being received from at least two position sensors associated with the piston assembly such that the comparing step determines whether the positional information of a first position sensor is greater than, equal to or less than positional information from a second position sensor; and aligning the piston assembly with the cylinder in response to the positional information.

2. The method of claim 1, including reading the positional information prior to the comparing step.

3. The method of claim 1, including moving the piston assembly in a first direction when the positional information from the first position sensor is less than the positional information of the second position sensor.

4. The method of claim 1, including moving the piston assembly in a second direction when the positional information from the first position sensor is not less than the positional information of the second position sensor.

5. The method of claim 1, including moving the piston assembly towards the cylinder when the positional information from the first position sensor is equal to the positional information of the second position sensor.

6. The method of claim 1, including determining whether the positional information from the first position sensor and the positional information of the second position sensor is equal to a predetermined value.

7. The method of claim 6, including determining whether the positional information from the first position sensor is greater than the predetermined value.

8. The method of claim 7, including raising the engine block when the positional information from the first position sensor is greater than the predetermined value.

9. The method of claim 7, including determining whether the positional information from the first position sensor is less than the predetermined value when the positional information from the first position sensor is not greater than the predetermined value.

10. The method of claim 9, including lowering the engine block when the positional information from the first position sensor is less than the predetermined value.

11. The method of claim 9, including stopping the comparing step and the aligning step when the positional information from the first position sensor is not less than the predetermined value.

* * * * *